INVENTORS
WILLIAM CASTEDELLO
WERNER K. BENDER

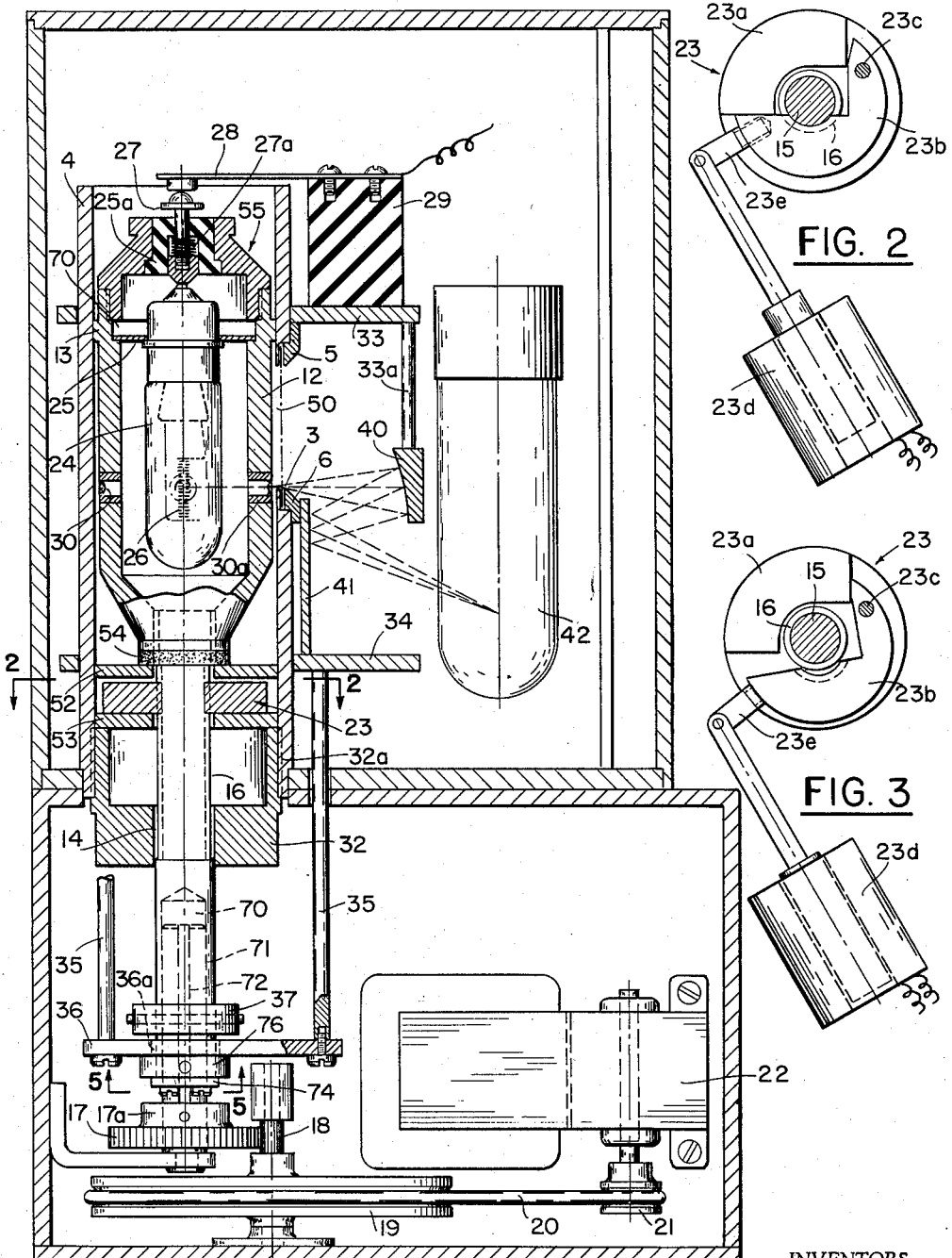

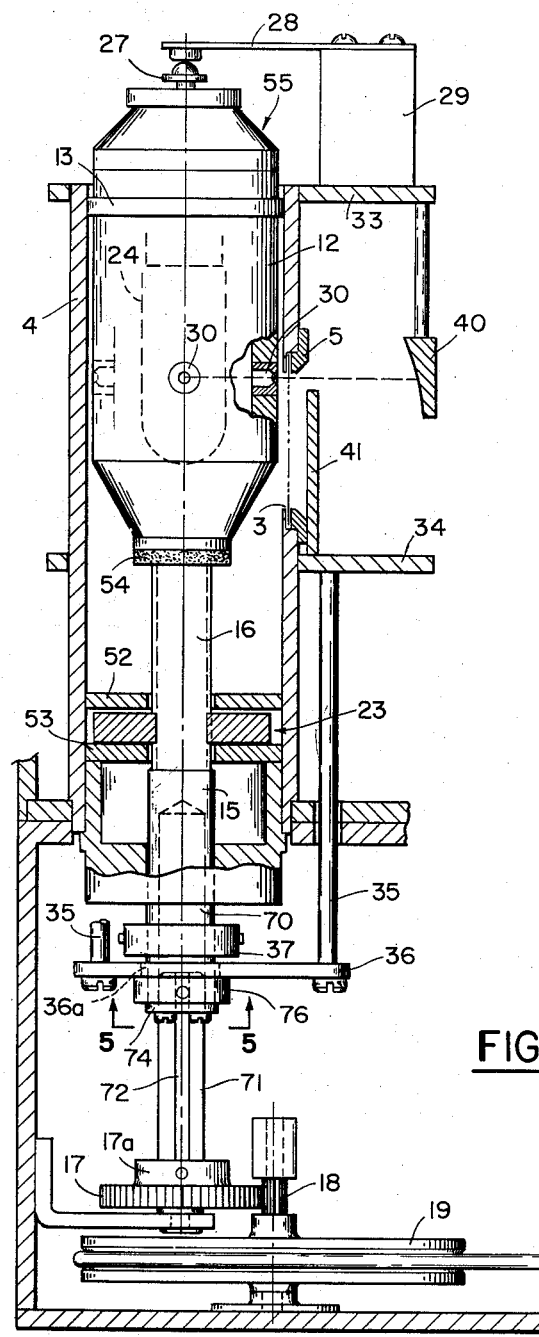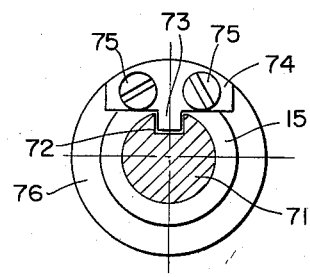

Sept. 26, 1961 W. CASTEDELLO ET AL 3,001,444
SOUND PROJECTOR FOR PROJECTING STILL TRANSPARENCIES ON
FILM AND REPRODUCING SOUND FROM A SOUND RECORD AREA
Filed April 27, 1959 7 Sheets-Sheet 4

INVENTORS
WILLIAM CASTEDELLO
WERNER K. BENDER
BY
*Aane and Nydick*
ATTORNEYS

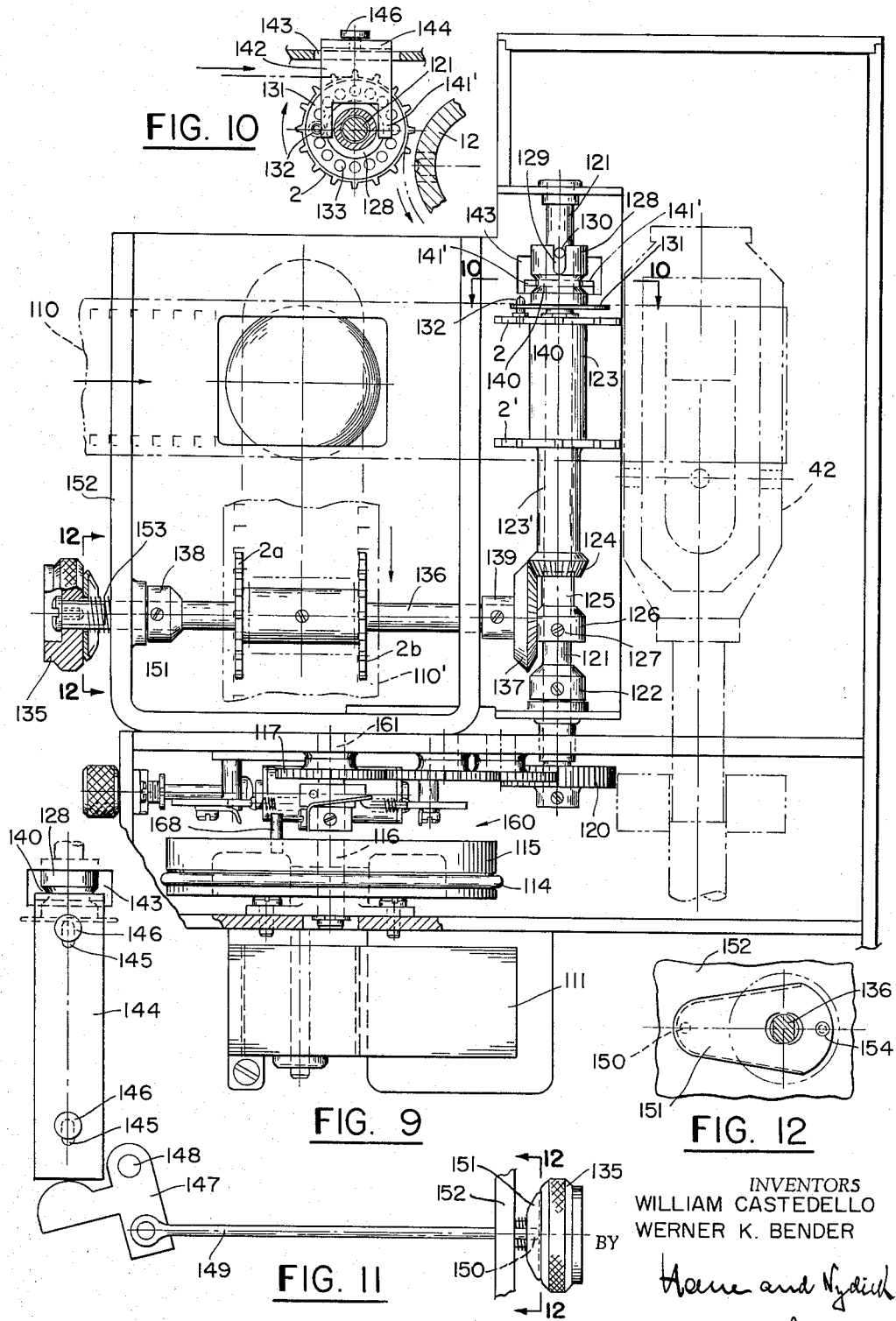

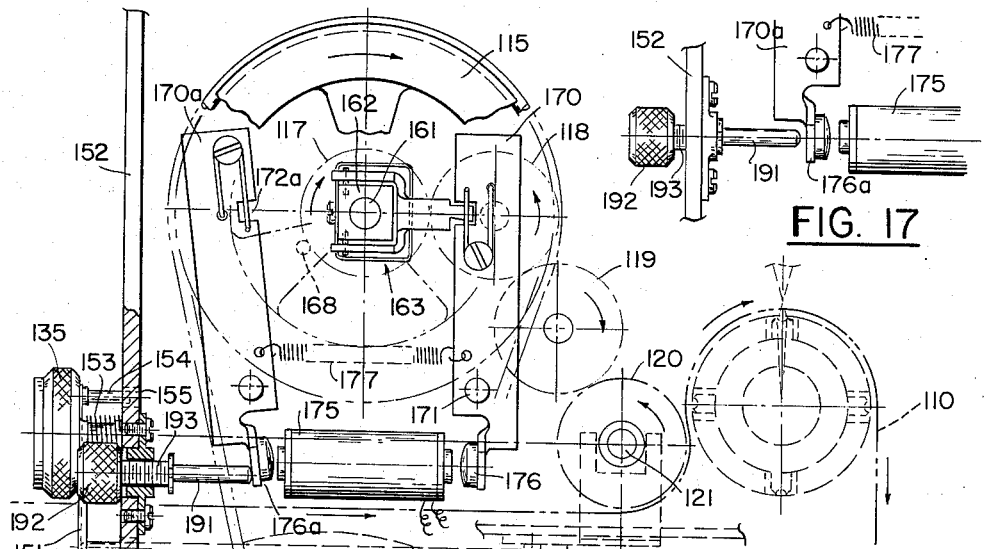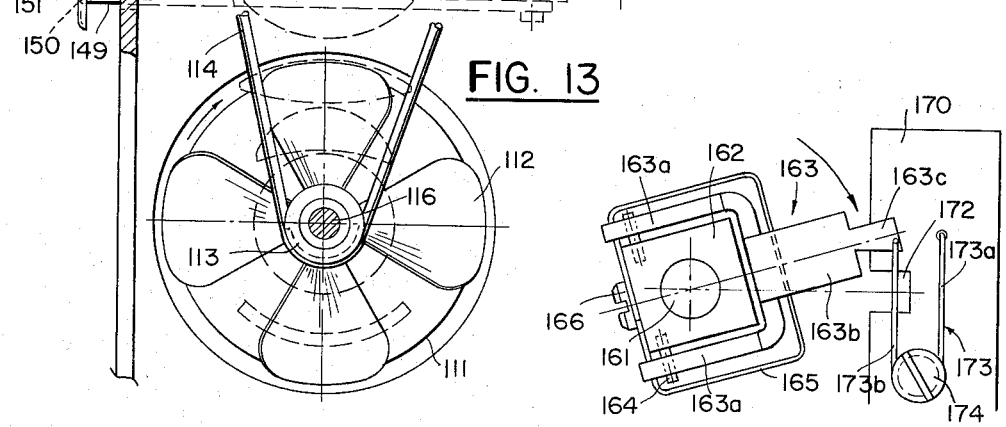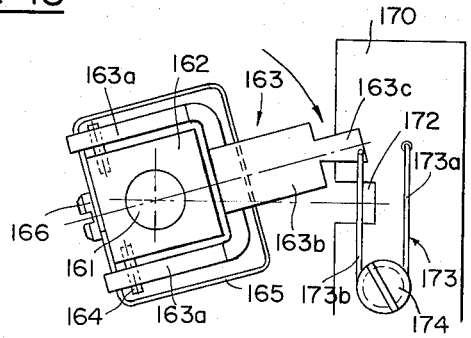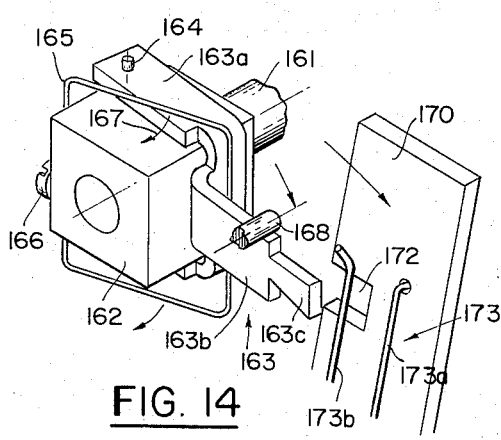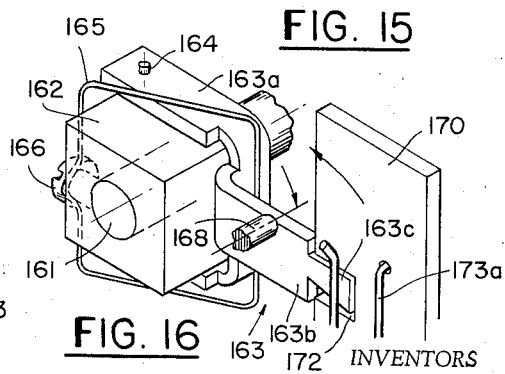

Sept. 26, 1961  W. CASTEDELLO ET AL  3,001,444
SOUND PROJECTOR FOR PROJECTING STILL TRANSPARENCIES ON
FILM AND REPRODUCING SOUND FROM A SOUND RECORD AREA
Filed April 27, 1959  7 Sheets-Sheet 7
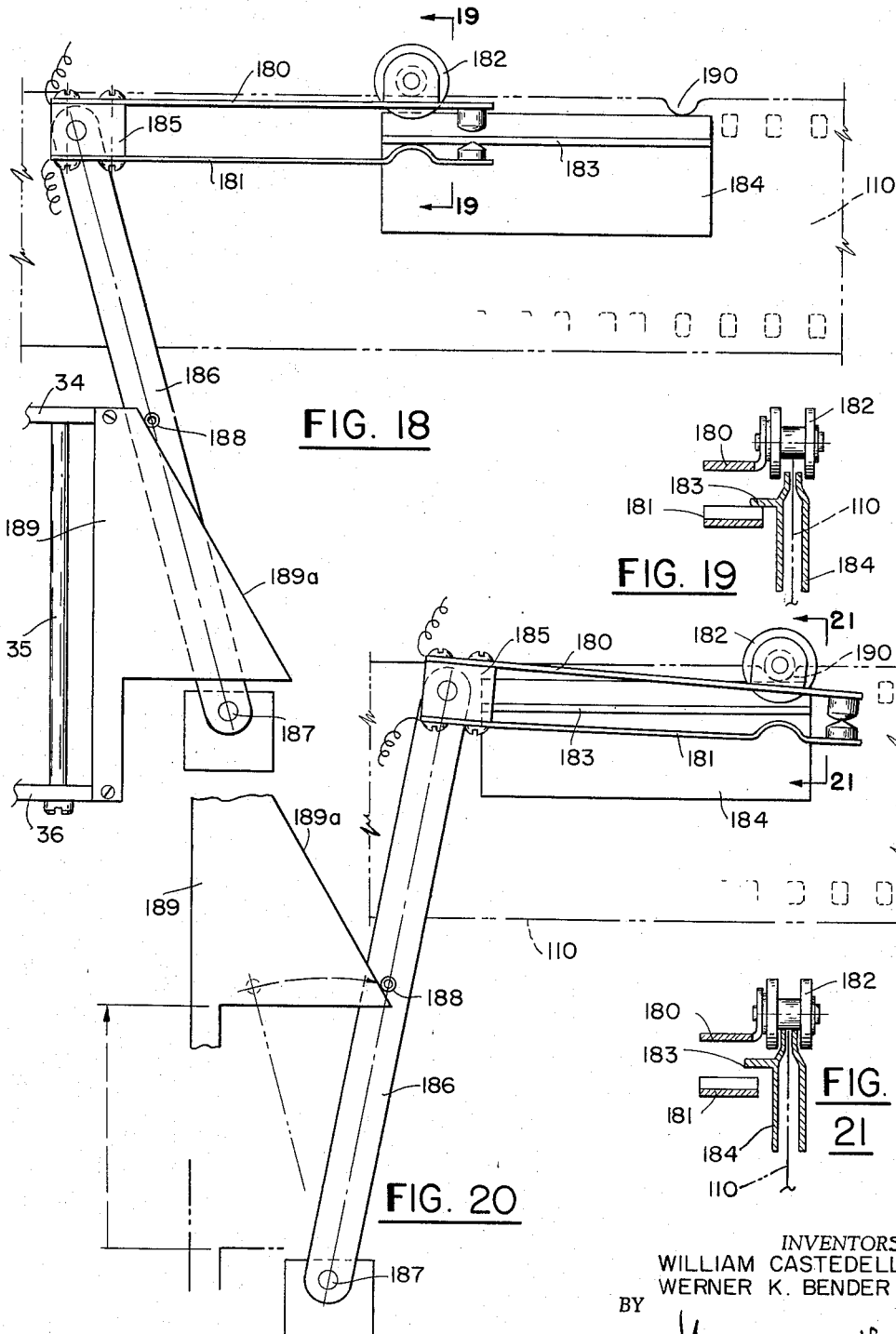
INVENTORS
WILLIAM CASTEDELLO
WERNER K. BENDER
BY
ATTORNEYS

United States Patent Office 3,001,444
Patented Sept. 26, 1961

3,001,444
SOUND PROJECTOR FOR PROJECTING STILL TRANSPARENCIES ON FILM AND REPRODUCING SOUND FROM A SOUND RECORD AREA
William Castedello and Werner K. Bender, Plainville, Conn., assignors to The Kalart Company Inc., Plainville, Conn.
Filed Apr. 27, 1959, Ser. No. 809,043
13 Claims. (Cl. 88—28)

The present invention relates to a sound projector for reproducing and projecting from a strip film bearing alternate sound record areas and picture areas in longitudinal spacing, and more particularly to sound projectors as disclosed in co-pending patent application Serial No. 779,676 filed December 11, 1958 by John A. Maurer.

Strip film of the kind above referred to, generally bears several picture areas and associated sound record areas. Each picture area and the associated sound record area or areas constitute a program, and it is generally necessary or at least desirable to present several programs in succession and to effect automatically the change-over from one program to another program.

Accordingly, the broad object of the present invention is to provide a sound projector for reproducing and projecting respectively from a strip film of the kind previously referred to, a sequence of successive programs.

More specifically, it is the object of the invention to provide in a sound projector of the general kind above referred to, transport means which upon completion of one program are activated to move the film strip through a distance such that the sound record area and the picture area of another program are in position for sound reproduction and picture projection respectively.

Another object of the invention is to provide in a sound projector of the general kind above referred to, transport means capable of selectively transporting the film strip either horizontally or vertically through the projector, the terms "horizontally" and "vertically" being primarily used to designate film movements at a right angle to each other.

Still another object of the invention is to provide film transport means which are automatically activated for moving the next program in position for presentation upon completion of the reproduction of sound from the preceding program.

It is also an object of the invention to provide for control of the automatic activation of the film transport means control means which are electrically controlled by a signal transmitted from the respective sound record area upon completion of the reproduction therefrom.

A further object of the invention is to provide for control of the automatic activation of the film transport means control means which are electro-mechanically controlled by markings of the film the location of which is correlated with the completion of the sound reproduction from a sound record area.

It is also an object of the invention to provide transport means which include means for accurately centering the sound record area and the picture area on a strip of film in front of the sound gate and the picture gate respectively of the sound projector.

Other and further objects, features and advantages of the invention will be pointed out hereinafter and set forth in the appended claims forming part of the application.

In the accompanying drawing, several preferred embodiments of the invention are shown by way of illustration and not by way of limitation.

In the drawing:

FIG. 1 is an elevational side view, partly in section, showing the sound projector in its position at the beginning of a scanning operation for scanning a sound record area on the strip film.

FIG. 2 is a section taken on line 2—2 of FIG. 1 showing in detail control means for controlling the motion of the scanning assembly of the projector.

FIG. 3 is a sectional view similar to FIG. 2, but showing the control means of FIG. 2 in a different operational position.

FIG. 4 is a sectional view similar to FIG. 1, but showing the scanning assembly at the end of a scanning operation.

FIG. 5 is a section taken on line 5—5 of FIG. 4 on an enlarged scale.

FIG. 9 is an elevational view, partly in section, of the film transport means of the projector.

FIG. 10 is a section taken on line 10—10 of FIG. 9 on an enlarged scale.

FIG. 11 is a detail view of some of the control components of the film transport means.

FIG. 12 is a section taken on line 12—12 of FIGS. 10 and 11.

FIG. 13 is a plan view, partly in section, of part of the transport means of FIG. 10.

FIGS. 14, 15 and 16 are enlarged perspective detail views showing parts of the transport means in different operational positions.

FIG. 17 is a further detail view of the transport means on an enlarged scale.

FIG. 18 is a fragmentary view of the electro-mechanical control means for automatically activating the film transport means upon completion of the reproduction from a sound record area, the control means being shown at the beginning of a sound reproduction.

FIG. 19 is a section taken on line 19—19 of FIG. 18.

FIG. 20 is a view similar to FIG. 18, but showing the control means at the completion of a sound reproduction, and FIG. 21 is a section taken on line 21—21 of FIG. 20.

Figure 8:
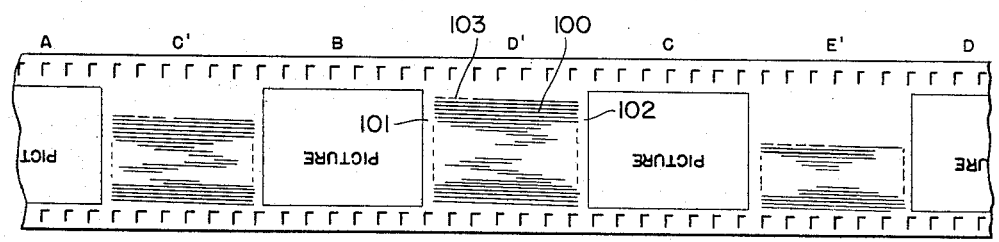
FIG. 8 is a view of a section of strip film of the kind previously described.

Referring now to the figures more in detail and first to FIG. 8, this figure shows a strip of film which carries picture areas A, B, C, D, etc. which are separated from each other by sound record areas C', D', E', etc. The sound record areas are on the strip of film in advance of the associated picture areas with reference to the direction in which the film is fed through the projector as is indicated by an arrow. While the picture areas and the sound areas alternate on the film, the associated areas are not disposed directly adjacent to each other. For instance, between picture area C and corresponding sound area C', a sound area D' and a picture area B are interposed. The picture area D associated with sound area D' is partly shown, but the sound area associated with picture area B would be to the left of the drawing. The disposition of the inclined record lines 100 and the narrow opaque areas 101 and 102 separating each record area from the adjacent picture areas are fully described in the aforesaid application Serial No. 779,676.

Film feed assembly

Figure 7:
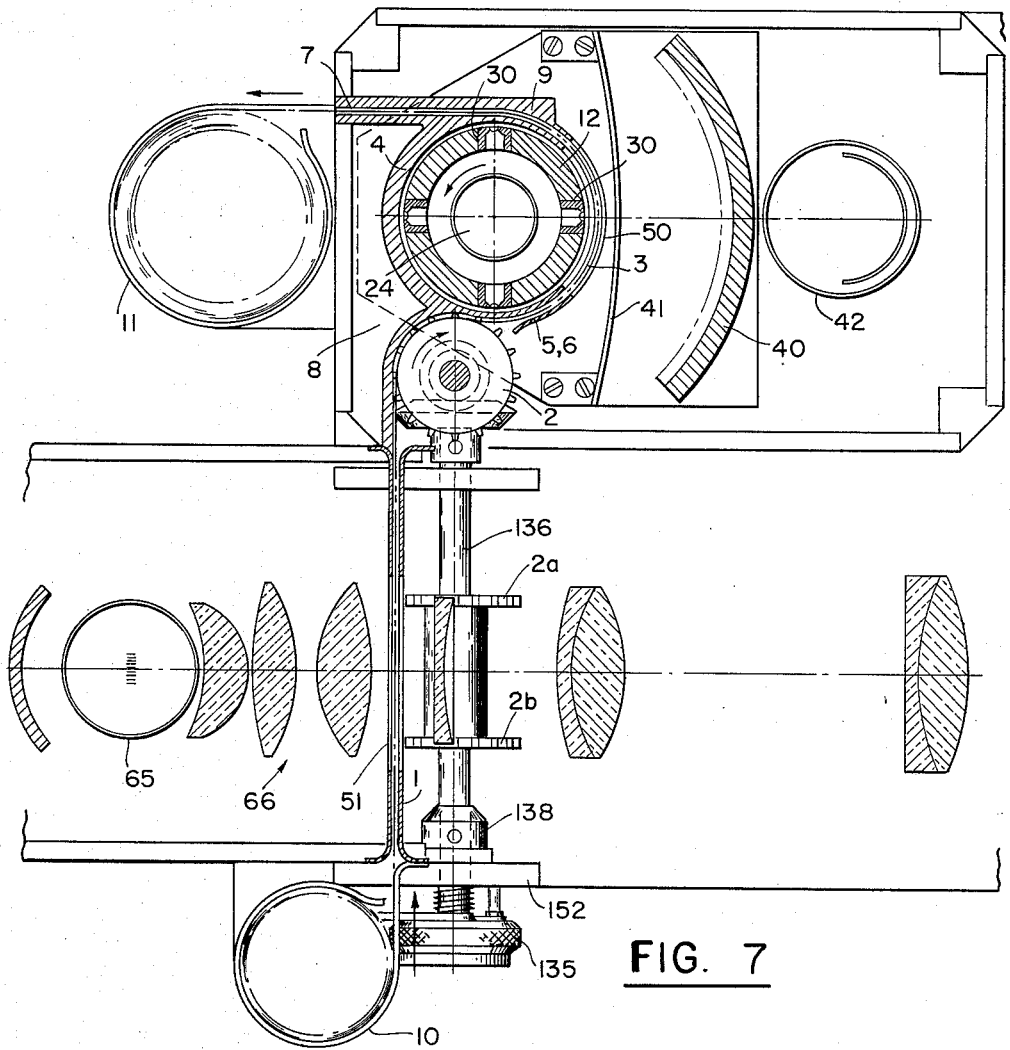
FIG. 7 is a plan view, partly in section, of the scanning assembly and also of the associated picture projecting assembly.

Turning now to the figures showing the structure according to the invention, and first to FIG. 7, a strip of film as described in connection with FIG. 8 is fed from a storage box 10 through a straight guide channel past a picture gate 51 in the picture projecting part of the projector and then around a feeding sprocket 2, which by means of its teeth engages the sprocket holes of the film and pushes the film into a channel 3. This channel constitutes a guide means of circular cross section. It extends half way about a substantially cylindrical tube 4. The guide channel 3 is formed by the cooperation of correspondingly curved upper and lower guide members 5 and 6. The guide members extend inwardly into a window 50 provided in the wall of tube 4. This window is very slightly wider than the film and its top and bottom edges serve to locate the film in front of the window in semi-cylindrical configuration. Upon emerging from channel 3, the film is guided into a straight channel 7 which is formed between one end of a support block 8 and a side piece 9 which is fastened to block 8 by any suitable means. Channel 7 leads the film into a take-up box 11 in which it accumulates as the reproduction and projection of the film proceed.

Channels 1 and 3 and sprocket 2 are so correlated and dimensioned with respect to each other that when a given picture area is in gate 51 in the picture projecting equipment the corresponding sound record area is centered in channel 3 and window 50.

The sound record area when centered in channel 3 and window 50 faces the optical system of the sound reproducing equipment. This system collects the scanning light and directs it to a photocell 42.

Scanning assembly

Guide channel 3 is curved and located in such a way that it is concentric with the inner and outer walls of tube 4. As can be seen in FIG. 1, within tube 4 a scanning drum or cylinder 12 is mounted rotatable about an axis coaxial with the longitudinal axis of tube 4 and hence also with the longitudinal axis of channel 3 and window 50. Tube 4 should be visualized as being stationary and is generally mounted in upright position. Drum 12 is accurately guided in tube 4 by an upper bearing 13 which rests against the inner wall of tube 4 and a lower bearing 14. The drum is carried on one end of a shaft 15 on which screw threads 16 are formed. The shaft is secured to the drum for joint rotation of the drum and the shaft is driven at a constant rate of speed by motor 22. The motor is drivingly coupled to shaft 15 by any suitable means having a suitable ratio of transmission. The transmission means are shown as comprising a small pulley 21, a belt 20, a large pulley 19, which also acts as a flywheel and gears 17 and 18.

In order to effect an axial displacement of the drum within tube 4, in addition to the rotation of the drum by the motor, the drum assembly coacts with a second transmission means 23 in which in one operational position effects axial lifting of the drum from a lowermost axial position shown in FIG. 1 to an uppermost axial position shown in FIG. 4 and in another operational position releases the assembly for return into the lowermost position. While the lowermost position is a fixed one, the uppermost position of the drum is variable as will be explained hereinafter. Transmission means 23 is shown more in detail in FIGS. 2 and 3. It comprises two parts, 23a and 23b, hinged together by means of a pivot pin 23c, to form a split nut. When the two parts of the split nut are in the position of FIG. 2, the threads of the nut parts engage the threads 16 formed on shaft 15. The split nut 23 is located within tube 4 by means of a large nut 32 which also forms the aforementioned lower bearing 14 for shaft 15 and with it for drum 12. Nut 32 can be threaded more or less deeply into tube 4 by means of threads 32a and the split nut 23 itself is placed between an upper and lower plate 52 and 53 axially slidable within tube 4, but preventing rotation of the nut 23 relative to tube 4. The closing and the opening of the split nut as shown in FIGS. 2 and 3 respectively can be controlled by any suitable control means. There is shown a solenoid 23d which controls by means of a linkage 23e the positions of nut parts 23a and 23b relative to each other and is in turn controlled by the axial position of the drum within tube 4 as will be more fully explained hereinafter.

As is evident, engagement of the nut threads with threads 16 on shaft 15 will impart to the drum an axial displacement at a rate determined by the pitch of the engaging threads. For the purpose of this description, it is assumed that the drum moves upwardly when the split nut is closed. To permit a combined axial and rotational movement of the drum, shaft 15 has at its lower end an axial bore 70 into which is telescoped a shaft 71 which is secured to gear 17 for rotation in unison therewith. Shaft 71 has a longitudinal groove 72 in which rides a nose 73 of a plate 74 as can best be seen in FIG. 5. Plate 74 is suitably secured for instance by two screws 75 to a collar 76 which in turn is secured to bracket 36 so that the entire sub-assembly will move up and down together with the lens drum as can best be apprehended from a comparison of FIGS. 1 and 4.

Opening of the split nut, that is movement of the parts thereof from the position of FIG. 2 into the position of FIG. 3, frees shaft threads 16 from engagement with the split nut parts. As a result, the drum will return by its own weight from its raised position within tube 4 (see FIG. 4) into the lowermost position of FIG. 1. The lowermost position of the drum is determined by the position of upper plate 52 in reference to tube 4. To cushion the impact of the drum upon plate 52, a soft washer 54 is provided at the lower end of the drum which will come in engagement with plate 52 when the drum descends.

The control of split nut 23 is preferably so arranged that the split nut is closed when the solenoid is de-energized and is opened upon energization of the solenoid. A spring may be provided to urge the parts of the split nut into the closed position. The control of the energizing circuit of the solenoid will be more fully explained hereinafter.

The scanning drum houses a lamp 24 having preferably a longitudinally disposed incandescent filament 26.

The lamp 24 is attached, as, for example, by means of solder, to a metal disc 25, in which it is adjusted prior to being attached in such a way that the filament 26 is on an axis perpendicular to the plane of disc 25 at its center.

Disc 25 is adapted to be dropped into, and to fit closely, a recess turned in the upper part of drum 12 so that its lower side is in a plane perpendicular to the axis of the drum and its cylindrical part is coaxial with it.

A cap 55 is threaded to screw into the top of drum 12, which is fitted with matching threads. An insulating sleeve 25a is pressed into the cap 55. In it is mounted a contact 27 which is pressed downward by a spring 27a.

When the lamp 24 is inserted into the drum 12 so that the attached disc 25 is seated in the recess 70 and the cap 55 is screwed into place as shown in the top of drum 12, the contact 27 is forced into contact with the center contact of the base of the lamp by the spring 27a, and therefore the face of the disc 25 is forced into contact with the plane surface upon which it rests, while the edge of the disc is substantially in contact with the cylindrical part of the recess. Thus the filament 26 of lamp 24 is constrained to lie on the axis of drum 12.

The contact 27 is engaged by a contact spring 28 carried on an insulating support 29. Spring 28 is connected to a suitable source of current, which is thus brought to the center contact of the lamp through contact 27. The other terminal of this source of current is attached to the body of the machine, and is connected to the lamp through drum 12 and the disc 25.

The lens system for directing the scanning beam or beams upon the sound area placed in scanning gate or window 50 is mounted in the wall of drum 12. The lens system is shown as comprising several small lenses 30 which are superimposed in a plane at right angle to the axis of rotation of drum 12 at circumferentially equal intervals. It has been found to be most advantageous to provide four lenses which are spaced apart at accurate 90° intervals. Each lens is held in a small lens mount 30a which can be radially adjusted by means of fine csrew threads for the purpose of focusing the lenses. Each lens is accurately focused upon the record lines on the emulsion surface of the film. The lenses are so designed that they have a very short focus and that the images of the filament 26 of lamp 24, as seen by the lenses, are reduced to very fine and very short lines. The radius of channel 3 is preferably made such that when the record area of the film is centered in it, the length of the sound record lines subtends an angle of 90° as seen from the axis of tube 4 which is also the axis of rotation of drum 12.

From the above relationships it may be seen that, given the correct pitch of screw threads 16 and assuming that the position of the split nut 23 is adjusted correctly, as the drum 12 rotates and advances axially, each line of the sound record area will be swept along its length by one of the four images of filament 26 as formed by lenses 30. Exactly at the instant when each image comes to the end of a record line, the next image comes to the beginning of the next higher record line due to the aforedescribed inclination of the record line relative to the longitudinal edges of the film and starts to scan such next record line. As a result, the scanning of the record lines is practically continuous from beginning to end. As is apparent, only one image is actively scanning at any one time except at the instant of transition from one line to the next when two are in use. The three scanning images which are not in use, except at the aforementioned instant of transition, are prevented from reaching the film by the opaque wall of tube 4. As previously mentioned, window or gate 50 is slightly longer than the exact length of the record lines so as to allow the scanning to proceed properly even if the sound record area is not centered perfectly. There is, therefore, a certain period of time near the instant of transition when two of the images formed by two of the lenses are within the area of gate 50. However, only one of the images is able to transmit light through the film because the other—the one which is about to begin to scan a record line or which has just finished scanning a line—is blocked by one of the opaque strips 101 or 102 on the film.

As is evident, high quality scanning requires that the images travel along the record lines rather than falling partly or wholly between them. The images can be adjusted in relation to the sound record lines by adjusting the position of split nut 23 within tube 4 by screwing nut 32 more or less deeply into tube 4.

Each beam of light which emerges from the convex side of the film as the film is being scanned, diverges at an angle of the order of 30°. Each beam, moreover, sweeps through a horizontal angle of 90° and rises progressively as the scanning takes place. Each beam, after being modulated by the record lines, impinges upon the light sensitive area of a photocell 42. This photocell is suitably mounted in the projector stationarily relative to the drum. There are available photocells which have a light sensitive area in excess of a length of one inch, so that the beams will fall upon the light sensitive area during the entire upward movement of the drum through a distance of one inch. However, as is evident, the length of the light sensitive area of a photocell as readily available, imposes a limitation upon the height or width of the sound record area that can be reproduced. Accordingly, it has been found advantageous to provide an optical system which moves together with drum 12. Such movable optical system is shown as comprising a toroidal mirror 40 and a suitably shaped mirror 41 which may be cylindrical. Both these mirrors are mounted in staggered relationship on a carriage which moves up and down together with drum 12 so that the horizontal center line of mirror 40 is always at the same height as the lenses 30, or in other words, coplanar with the plane of the lenses. The carriage comprises an upper plate 33 from which mirror 40 is suspended by one or several studs 33a, a lower plate 34 which supports mirror 41, two or more upright rods 35 and a follower plate 36. Plate 36 has a center hole 36a slightly larger than the diameter of shaft 15. Plate 36 is placed on the shaft between the hub 17a of gear 17 and a suitably secured collar 37. The space between gear 17 and collar 37 is just enough to allow freedom for shaft 15, gear 17 and collar 37 to turn. When gear 17 is rotated by gear 18 to impart the scanning movement to the drum, the carriage which supports mirror 40 and 41 is moved upward by the afore-described combined action of screw threads 16 and split nut 23 at the same rate as the scanning drum 12 is moved upward. Hence, the vertical relationship of lenses 30 and toroidal mirror 40 always remain the same.

As appears from the previous description, the scanning operation is completed when the drum has reached an axial position within tube 4 such that one of the lenses 30 has swept the uppermost record line, the scanning starting with the lowermost record line as shown in the figures. FIG. 1 shows the drum in lowermost position, that is, at the beginning of a scanning operation, and FIG. 4 shows the drum in the position in which the scanning operation has been completed. In order to return the drum and with it the carriage from the position of FIG. 4 into the position of FIG. 1 to ready the scanning assembly for a new scanning operation, the upward drive of the drum must be terminated without stopping the rotation of the drum if a further scanning operation is to follow substantially immediately to the scanning operation just completed. As previously described, the upward movement is transmitted to the drum by the engagement of the split nut 23 with threads 16. Hence, release of this engagement will terminate the upward movement of the drum and also free the drum and the components associated therewith for return by its own weight into the initial position in which it is stopped by engagement of soft washer 54 with plate 52.

Figure 6A:
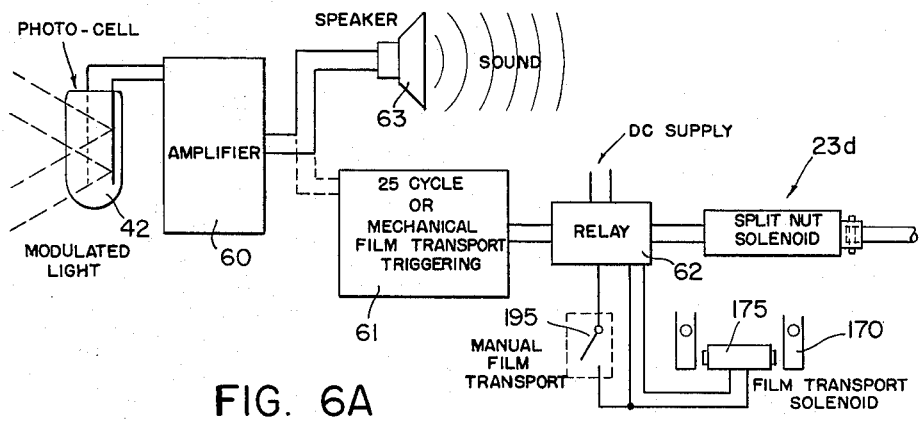
FIG. 6A is a diagram of a circuit system suitable for controlling the control means of FIGS. 2 and 3 and also the film transport means.

The release of the split nut can be effected by any suitable means. It can be accomplished by mechanical means such as a catch which is tripped by engagement with the drum when the latter reaches a predetermined axial position closing contacts which in turn close an energizing circuit for solenoid 23d previously described. Arrangement of this kind are well known in the related art and hence it is believed that a detailed description thereof is not essential for the understanding of the invention. While the described arrangements are effective, they limit the release of the drum for return into the initial lowermost position to the drum reaching a fixed axial position in reference to tube 4. In actual practice, the record lines do not necessarily occupy the entire width or height of the film and hence release of the drum in a fixed axial position would cause a longer or shorter period of silence following the completion of the sound reproduction before a new reproduction can begin and such intervening period of silence is not always desirable. Accordingly, it has been found preferable to provide means by which the split nut is released upon completion of the sound reproduction. These means may comprise a signal producing record line following the uppermost record line 100 of the sound record area. This signal producing record line is indicated in FIG. 8 by a dashed line 103 and produces a signal. A twenty-five cycle signal has been found suitable. As is shown in FIG. 6A, this signal is picked up by the photocell and transmitted through an amplifier 60 to a resonance circuit 61 which through a relay 62 controls the energization of solenoid 23d and energizes the solenoid for a period of time sufficient to free shaft 15. Circuit arrangements of the just described kind are well known in the art and hence need not to be described in detail for the understanding of the invention.

The optical system formed by mirrors 40 and 41 picks up light from the scanning of every part of the record area and directs it upon the light sensitive area in photocell 42. The center of the curvature of toroidal mirror 40 in the horizontal direction is on the axis of tube 4 and hence also on the axis of rotation of scanning drum 12. Thus, all the beams of light from the lenses 30 will impinge radially upon the surface of mirror 40 during the entire scanning operation and therefore will be reflected directly back toward the center of curvature of mirror 40. As the reflecting surfaces of mirror 40 is downwardly inclined, the bundles of light are directed downwardly and impinge upon mirror 41. After a second reflection from this mirror, they are all directed toward the light sensitive surface of photocell 42.

The light modulated signals picked up by the photocell are fed to amplifier 60 which is connected to a loudspeaker 63 in a well understood manner. Amplifier 60 may be the same amplifier that is used for controlling the operation of solenoid 23d.

Figure 6B:
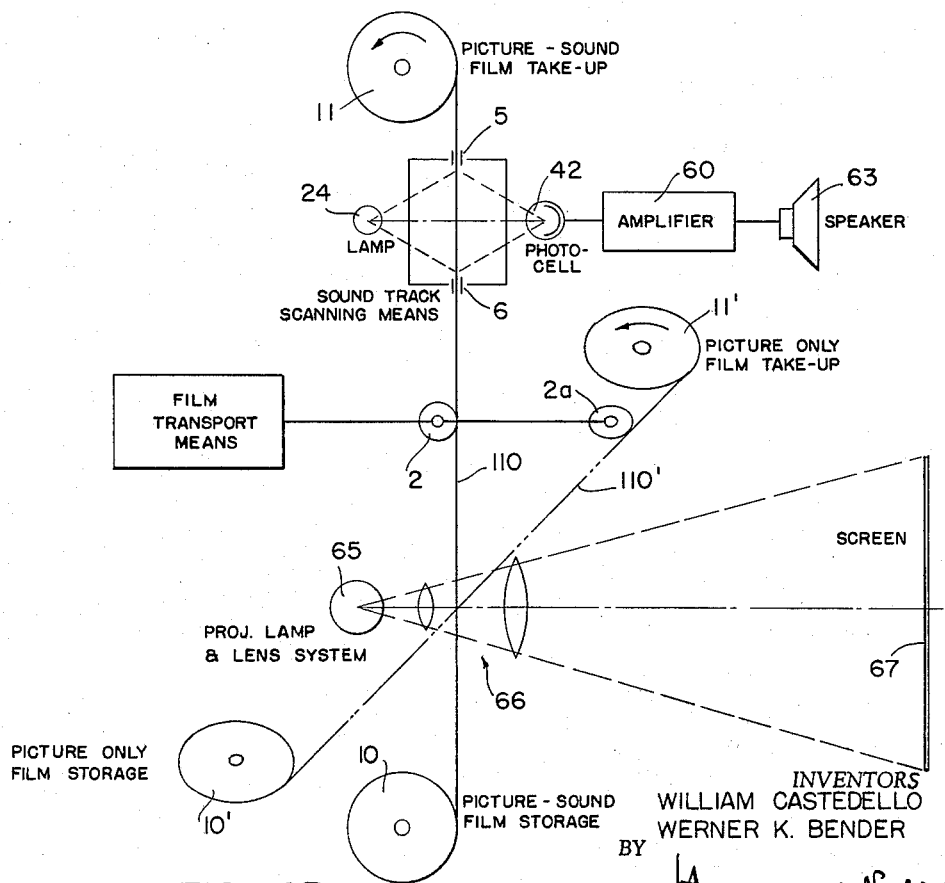
FIG. 6B is a diagram of the sound reproducing and picture projecting equipment of the sound projector, and also of the film transport means of the projector for transporting the film either in horizontal or vertical direction.

The picture projecting equipment of the projector does not constitute part of the present invention. It is shown diagrammatically in FIG. 6B and more specifically in FIG. 7. It comprises a projection lamp 65 and a lens system 66 of suitable design. The pictures may be projected upon a screen 67.

Upon completion of the presentation of a program and return of the drum from the position of FIG. 4 into the position of FIG. 1, the reproduction and projection respectively of a new program is initiated. This is effected by turning sprocket 2 and its companion sprocket 2' until a new sound record area and a new picture area are centered in gates 50 and 51 respectively. The sprockets are in engagement with the sprockets of film 110 guided horizontally through the projector as is shown in FIG. 9.

All the features heretofore described are also disclosed in the aforesaid co-pending application Serial No. 779,676 and claimed in said application. The present invention relates to the transport means for rotating sprockets 2 and 2' through the required distance upon the completion of a program which generally encompasses a picture area and an associated sound record area, but may also consist of a picture area only as will be more fully explained hereinafter.

The transport means according to the invention will now be described in detail.

Film transport means

The transport means are power driven and the power for operating the transport means is derived from a motor 111. The shaft of this motor seats a cooling fan 112 and a pulley 113 which by means of a belt 114 drives a flywheel 115. The flywheel is seated on a shaft 116 which through a gear train including gears 117, 118, 119 and 120 drives a shaft 121. Shaft 121 is suitably and rotatably mounted in a housing part by means of a collar 122. The shaft seats, rotatably and axially slidable, a sleeve 123 to which are secured sprockets 2 and 2' and which has an extension 123', the lower end of which mounts a bevel gear 124. The entire assembly just described is retained in its axial position on shaft 121 by means of a sleeve 125 which in turn is fixedly secured to the shaft 121 by means of a collar 126 and a set screw 127. Sleeve 123 and with it sprockets 2 and 2' can be releasably coupled with shaft 121 by means of a coupling member 128. This coupling member has a cylindrical part, longitudinally slotted at 129. The slot is slidably engaged by a pin 130 extending from shaft 121 so that a rotation of shaft 121 is transmitted to coupling member 128. The rotation of coupling member 128 is transmitted to sleeve 123 by means of a disc 131 secured to member 128. Disc 131 is engaged by a pin 132 protruding from sprocket 2. As can best be seen in FIG. 10, disc 131 has a plurality of circumferentially spaced holes 133 any one of which may be engaged by pin 132 which is preferably somewhat pointed to facilitate penetration into one of the holes 133.

As is evident, lifting of coupling member 128 will disengage the coupling between coupling member 128 and sleeve 123 so that sleeve 123 and with it the sprockets can be turned independently of shaft 121 when coupling member 128 is lifted. Rotation of the sprockets will effect a corresponding movement of film 110 and the movement of the film independent of a rotation of shaft 121 is used for centering the program areas in front of the respective gates. After the film has been centered, coupling member 128 is lowered again and engagement of pin 132 with the hole 133 now facing it will secure shaft 121 and sprockets 2 and 2' in an angular position relative to each other in which the film is centered. Rotation of the sprockets independent of shaft 121 for purpose of centering the respective film areas in the gates is effected by turning a knob 135 which is secured to a shaft 136. This shaft seats a bevel gear 137 which is in mesh with bevel gear 124. Shaft 136 is journalled in a suitable part 152 of the projector housing by means of collar 138 and 139.

In order to free the sprocket sleeve 123 from shaft 121 to permit rotation of knob 135, a coupling release assembly is provided. This assembly comprises a circumferential groove 140 in coupling member 128. This groove is straddled by the two arm 141' of a plate 142 which extends through an opening 143 in the projector housing. Plate 142 is continued in a strip 144 extending at a right angle from plate 142. Strip 144 has one or several longitudinally elongated slots 145 through which fastening pins or screws 146 are inserted in a housing wall thus permitting longitudinal displacement of the entire assembly within the limits given by slots 145. The lower end of strip 144 is engaged by one arm of a bell crank lever 147 pivotal about a pivot pin 148 extending from the projector housing. The other arm of the lever is pivoted to one end of a bar 149 the other end of which is secured at 150 to a preferably somewhat springy metal plate 151, the shape of which can best be seen in FIG. 12. Plate 151 is interposed between knob 135 and the adjacent housing wall 152 and is urged by a spring 153 toward knob 135, that is, into the position best shown in FIGS. 9 and 13. To prevent twisting or turning of spring plate 151, a pin 154 extends from the plate slidable in a hole 155 in housing wall 152.

As is apparent, pressure applied to plate 151 forcing the same toward housing wall 152, will cause bar 149 and lever 147 to effect a corresponding lifting of strip 144 and with it of plate 142. As a result, disc 131 of coupling member 128 is lifted out of engagement with locking pin 132, slot 129 permitting such lifting of the coupling member. Sprockets 2 and 2' can now be turned for centering the film by rotating knob 135 until the coupling between shaft 121 and the sprocket sleeve 123 is restored by releasing spring plate 151.

As previously stated, shaft 121 and with it the sprockets are power driven from motor 111.

In order to limit the transport of the film upon completion of a program to the distance required for moving a new program into position for reproduction and projection, an automatically controlled coupling self-releasing upon completion of the transport of the film through the aforedefined distance is interposed between the motor drive shaft 116 and shaft 121, or more specifically, gear 117 of the gear train. This self-releasing coupling and its control are generally designated by 160 and will now be described in detail in connection with FIGS. 13 through 17.

Gear 117 which is the input gear of the gear train is fixedly seated on a shaft 161. This shaft which is independent of motor drive shaft 116 as can best be seen in FIG. 9, also seats a block 162 fixedly secured thereto. Block 162 mounts a member 163. This member constitutes the coupling member proper. It comprises two arms 162a which straddle block 162 and are hinged to the block by means of pins 164 to provide for pivotal movement of coupling member 163 relative to block 162 about an axis at a right angle with the axis of shaft 161. Member 163 further comprises an arm 16b which terminates in a set-off tongue like portion 163c. This tongue is wedge shaped along one edge for a reason which will appear from the subsequent description. A spring 165 secured to block 161 by any suitable means such as a screw 166, engages extension 163b and urges the coupling member to turn into the direction indicated by arrow 167 in FIG. 14.

Coupling member 163 is arranged to coact with a drive pin 168 which extends from flywheel 115 (see FIG. 9) and hence rotates when motor 111 is operated. Drive pin 168 engages coupling member extension 163b when the coupling member is in the position of FIG. 14, but clears the coupling member when the latter is in the position of FIG. 16. As is evident, engagement between the drive pin and the coupling member will effect rotation of the sprockets 2 and 2' through shaft 161, the gear train, shaft 121 and coupling member 128. The overall ratio of transmission is so selected that one complete revolution of shaft 161 will effect transport of the film through the distance required for moving a new program into position for presentation.

Movement of coupling member 163 into and out of engagement with driving pin 168 is controlled by a control assembly comprising an arm 170 supported by a housing wall, pivotal about pivot pin 171. Arm 170 has in its edge facing the coupling member a recess 172 which fits tongue 163c. There is further provided on one side of arm 170 a generally U-shaped wire spring 173. This spring is secured at its base to the housing wall by means of a screw thread 174 and one shank 173a of the spring is also secured to the housing. The other arm 173b is free and overlies recess 172.

Arm 170 may either occupy the slanted position of FIG. 14, or the perpendicular position of FIG. 16. In this connection, it may be noted that the terms "slanted" and "perpendicular" are, of course, used for purpose of illustration only.

Starting with the position of FIG. 14, it is apparent that coupling member 163, when driven by pin 168 is clear of recess 172 and can pass in front thereof.

In a manner explained hereinafter, arm 170 is moved into the position of FIG. 14 only temporarily for a period of time just sufficient for tongue 163c to clear the recess.

FIG. 15 shows arm 170 returned into its perpendicular position and coupling member 163 has very nearly completed one revolution in the direction of the arrow. When tongue 163c reaches the position of FIG. 15, it finds spring arm 173b in its path and it is guided by this spring into the recess 172 as is shown in FIG. 16. As a result, coupling member 163 is forced from the pivotal position of FIG. 14 into the pivotal position of FIG. 16 and thus out of engagement with driving pin 168. To facilitate guidance of tongue 163c into the recess without undue jerk, spring arm 173b is curved outwardly at its tip as clearly shown in FIGS. 14 and 16. The smooth guidance of the tongue is further aided by the aforementioned slanted edge of tongue 163c which effects a gradual engagement between the tongue and the spring arm. Coupling member 163 remains in the disengaged position of FIG. 16 until arm 170 is again moved from the position of FIG. 16 into the position of FIG. 14 upon completion of the program.

The pivotal position of arm 170 is controlled by a solenoid 175 and for this purpose arm 170 mounts an armature member 176.

As is shown in FIG. 13, the arm assembly just described is duplicated and the two arms 170 and 170a are joined by a spring 177 loaded to pull both arms toward the perpendicular position of FIGS. 15 and 16.

The arrangement of the second arm assembly and the function thereof should be disregarded for the time being and will be subsequently explained.

As is evident, energization of solenoid 175 pulls arm 170 from the position of FIG. 16 into the position of FIG. 14 and de-energization of the solenoid will free the arm for return into the position of FIGS. 13 and 16 by the action of spring 177.

The energization of solenoid 175 may be electronically or electro-mechanically controlled.

Electronic control is indicated in FIG. 6A. It is derived from the signal which, at the end of a scanning operation, controls the solenoid of the split nut. As is shown in FIG. 6A, relay 62 which controls the split nut solenoid also controls the film transport solenoid. Both solenoids are energized for the period of the signal only and possibly of any delay network included in the electronic circuit.

Electro-mechanical control is shown in FIGS. 18 through 21. This control comprises a make-switch having two contact springs 180 and 181 which should be visualized as being connected to the terminals of the solenoid coil through an appropriate source of current. Contact spring 180 mounts a grooved roll 182 which rides along the top edge of film 110. Contact spring 181 underlies and is guided by a bracket 183 extending from a guide channel 184 in which film 110 is guided. The arrangement is such that when roll 182 is resting upon the edge of the film and contact spring 181 is restrained by bracket 183, the contact points of the two springs are held separate from each other as is shown in FIGS. 18 and 19. The contact spring assembly is secured to an insulation block 184 to which is pivoted one end of an arm 186, the other end of which is pivoted at 187 to a housing wall. Arm 186 mounts a follower pin 188 which coacts with a camming surface 189a of a block 189. Block 189 is mounted on the carriage assembly 34, 35 and 36 for mirrors 40 and 41 and hence moves upwardly with the carriage during a scanning operation. Accordingly, the camming surface 189a will gradually pivot arm 186 during the scanning operation and with it cause roll 182 to move toward the right as seen in the figures. Hence roll 182 will always occupy a definite position at the end of each scanning operation.

The edge of the film upon which roll 182 rides is notched at the point which the roll will occupy upon completion of the respective scanning operation, one notch 190 being shown. As is evident, the notches are not necessarily equally spaced and in fact more often than not will be unequally spaced since the messages associated with the individual picture areas are of different lengths and hence the scanning drum will reach its top position at different levels.

FIGS. 20 and 21 show roll 182 in engagement with notch 190. Due to the resulting drop of roll 182 the contact points of contact springs 180 and 181 are now in engagement, thus energizing the solenoid. As a result, the film transport is immediately activated whereby roll 182 is forced out of the notch thus de-energizing the solenoid.

The operation of the projector as hereinbefore described, is generally self-evident. It suffices to state that to prepare the projector for the reproduction and projection of a strip of film bearing several programs, the strip film is threaded into the aforedescribed guide channels past sprockets 2 and 2', gates 51 and 50. The roll of strip should be visualized as being initially in storage box 10 to be gradually wound up in take-up box 11.

The film is placed in a position such that the first sound record area is approximately in registry with gate 50 whereby the first picture area is approximately in registry with gate 51. The operator then depresses spring 151 to release the sprockets from shaft 121 and turns the sprockets by means of knob 135 until the record area and the picture area are accurately centered in the respective gates whereupon spring 151 is released to restore the coupling between shaft 121 and coupling member 128.

The projector is now ready for operation which is initiated by starting the projector motors. The entire further operation of the projector is fully automatic. The scanning drum 12 will begin its scanning operation, performing a combined rotational and axial motion while scanning. As the scanning drum rises, roll 182 (assuming that the electro-mechanical control is used) will move from its initial position (see FIG. 18) toward the position of FIG. 20.

When the scanning drum has completed the scanning operation, or in other words, reached its uppermost position, the solenoid 23d of the split nut is activated (see FIG. 6A) thereby releasing the drum and all the components associated therewith for return from the position of FIG. 4 into the position of FIG. 1. Simultaneously or about simultaneously with the activation of the split nut, solenoid 175 of the film transport means is also activated. As a result, the film transport means moves the film through a distance just sufficient to bring the next sound record area and picture area into registry with the respective gates. As the spacing between all the areas on the film is uniform and fixed, a re-centering of the film is not necessary. Upon completion of the film transport, the film transport means stop themselves automatically and the projector will begin its next cycle.

In the previous description, the operation of the projector for reproducing and projecting a strip of film bearing alternating sound record and picture areas has been described. The film strip is shown as moving through the projector in horizontal direction.

The projector according to the invention further provides for projecting film without sound, that is, film which has picture frames only, next to each other. Such film 110' is shown in FIG. 9 moving vertically through the camera. The drive for the second film is derived from drive shaft 121 also, through bevel gear 137 and shaft 136 upon which are seated sprockets 2a and 2b. The arrangement and drive of the second strip of film is diagrammatically indicated in FIG. 6B. As is evident, only one kind of film can be inserted in the projector at one time.

As is apparent, for the presentation of a film bearing picture areas and sound record areas, the film must be moved through a distance corresponding to two areas in order to place each area in front of the respective gate, whereas for the presentation of film bearing picture areas only, the film must be moved through a distance corresponding to one area in order to place successive adjacent picture frames in front of the picture gate 51. Accordingly, the distance through which the transport means must move film 110' bearing picture frames only is half of the distance previously described.

The second arm 170a serves to half the distance of the film movement by the transport means. When sound film is inserted in the projector, arm 170a is immobilized by means of a pin 191 which abuts against the armature portion 176a of the arm. Pin 191 can be withdrawn from the armature portion by turning knob 192 of a screw 193 as in shown in FIG. 17.

When arm 170a is freed, it will be attracted and pivoted by the energization of solenoid 175 in the same manner as arm 170. As is evident, the recess 172a of arm 170a is at a distance of 180° from the starting position of tongue 163c in the recess of arm 170. Accordingly, coupling member 163 will be stopped and released after a 180° turn rather than after a 360° turn, or in other words, shaft 161 will perform one-half revolution thereby causing transport of the film through half the distance only.

The function of the alternate film control just described will be generally evident from the previous description.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. A sound projector for projecting images and reproducing sound respectively from a stationary single strip of transparent film bearing both several photographic picture areas and associated photographically recorded sound record areas alternating in longitudinally spaced uniform relationship, each picture area and the associated sound record area constituting a program, said projector comprising film guide means including a picture gate and a scanning gate, scanning means for optically scanning a sound record area in registry with said scanning gate, film transport means for moving the film step-by-step through the guide means and past said gates, drive means for driving said transport means, self-releasing coupling means for intermittently coupling said drive means to said transport means, said self-releasing coupling means comprising a coupling member drivingly coupled with said transport means and movable between a position drivingly engaged by the drive means and a position disengaged from the drive means, and spring means biasing the coupling member into the disengaged position, each activation of said coupling means coupling the transport means and the drive means for movement of the transport means through a predetermined distance thereby moving another sound record area and picture area on the film into registry with the respective gates, actuating means for actuating said coupling means, and coupling control means operating said actuating means and controlled by said scanning means upon completion of the scanning of the sound record area, said actuating means when operated by the control means moving the coupling member into the engaged position, and stop means disengaging and arresting the coupling member after a predetermined distance of movement thereof.

2. A sound projector according to claim 1 wherein said coupling member is a rotary member, rotation of said member in its plane of rotation through a predetermined angle causing a movement of the transport means through said predetermined distance, said coupling member being pivotal transversely of said plane of rotation between its position of engagement and its position of disengagement, and wherein said actuating means are movable by the control means into and out of the path of rotation of the coupling member, said stop means being provided on said actuating means for movement in unison therewith and engaging said coupling member when and while in the path of rotation thereof.

3. A sound projector according to claim 2 wherein said actuating means comprise a pivotally mounted arm spring biased into the position out of the rotational path of said coupling member, and a solenoid means coacting with said arm for attracting the latter into said rotational path, the state of energization of said solenoid means being controlled by said control means.

4. A sound projector according to claim 3 wherein said arm has a recess engageable by said coupling member when said arm is positioned in the rotational path of the coupling member and clearing the coupling member when said arm is positioned out of said rotational path, and wherein spring means bias and guide the coupling member into said recess, said recess and spring means constituting said stop means.

5. A sound projector according to claim 1 wherein said coupling control means are electro-mechanical control means comprising an energizing circuit controlling activation of said actuating means, switch means included in said circuit, and switch actuating means for controlling said switch means, said switch actuating means being movable in conformity with the scanning operation of the scanning means and controlling said switch means upon reaching a predetermined position indicative of the completion of the scanning operation.

6. A sound projector according to claim 5 wherein said switch means comprise a movable switch contact element biased into the switch closing position, and wherein said switch actuating means comprise a movable switch control member coacting with said switch contact element for restraining the latter in its switch opening position, said switch control member moving in conformity with the scanning operation and releasing said switch contact element for closing the switch means upon reaching a position corresponding to the completion of the scanning operation.

7. A sound projector according to claim 6 wherein said switch control member is movable between a position restraining said switch contact element in its switch opening position and a position freeing said switch contact element, said control member being held in the restraining position by riding along one longitudinal edge of the film and released from said position by engaging a recess in said film edge, said recess being indicative of the completion of the scanning operation.

8. A sound projector according to claim 5 wherein said scanning means are movable relative to the scanning gate and include drive means for moving the scanning means toward a limit position during the scanning operation, and wherein said switch actuating means are drivingly coupled with said scanning means for movement in unison therewith, said switch actuating means controlling said switch means upon said scanning means reaching the limit position.

9. A sound projector according to claim 1 wherein said transport means comprise a rotary driving member and a rotary driven member, said driven member including an output element engageable with the film for moving the latter, motor drive means for driving said driving member, manually operable drive means coupled with said driven member, releasable coupling means for coupling said driving member and said driven member, and control means for disengaging said coupling means whereby said film is movable by said manually operable drive means.

10. A sound projector according to claim 9 wherein said coupling means comprise two coupling members, one being drivingly coupled with said driven member and the other being drivingly coupled with said output element, one of said coupling members having a protruding coupling element and the other a plurality of circumferentially spaced receiving openings for connecting the two coupling members in a selected one of several predetermined positions relative to each other.

11. A sound projector for selectively projecting images and reproducing sound respectively from a stationary strip film bearing both several picture areas and associated sound record areas alternating in longitudinally spaced uniform relationship, each picture area and the associated sound record area constituting a program, and for projecting images from film bearing picture areas only, said projector comprising first film guide means including a picture gate and a scanning gate, scanning means for scanning a sound record area in registry with said scanning gate, second film guide means including a picture gate, first film transport means for moving film bearing picture and sound record areas through the first guide means and the gates therein, second film transport means for moving film bearing picture areas only through the second guide means and the gate therein, drive means for driving either of said transport means, self-releasing coupling means for intermittently coupling said drive means to either of said transport means, first coupling control means for coupling said drive means to said first transport means to activate said first transport means for movement through a predetermined distance, said movement moving the film bearing picture and sound record areas through a distance placing another sound record area and picture area in registry with the respective gates, second coupling control means for coupling said drive means to said second transport means to activate said second transport means for movement through a predetermined distance different from said first predetermined distance, said movement moving the film bearing picture areas only through placing another picture area on said film in registry with the respective gate, and automatic control means controlling said first coupling control means for actuating the coupling means and controlled by said scanning means upon completion of the scanning of a sound record area.

12. A sound projector according to claim 11 wherein said self-releasing coupling means comprise a coupling member drivingly coupled with both said transport means and movable between a position engaging said drive means for coupling action and an inoperative position, and wherein said first and second coupling control means each comprise a stop means disengaging and arresting the coupling member when the same has moved through a distance corresponding to the respective predetermined distance of the respective transport means.

13. A sound projector according to claim 12 and further comprising means for rendering said second coupling control means selectively inoperative.

References Cited in the file of this patent
UNITED STATES PATENTS

| 2,136,209 | Finch | Nov. 8, 1938 |
| 2,144,738 | Musumeci | Jan. 24, 1939 |

FOREIGN PATENTS

| 337,151 | Great Britain | Oct. 30, 1930 |